United States Patent
Miller et al.

(10) Patent No.: US 8,218,599 B2
(45) Date of Patent: Jul. 10, 2012

(54) METHOD AND APPARATUS FOR MULTIPLE ACCESS OVER A COMMUNICATION CHANNEL

(75) Inventors: Mark J. Miller, Vista, CA (US); Mark D. Dankberg, Encinitas, CA (US); Charles N. Pateros, Carlsbad, CA (US)

(73) Assignee: ViaSat, Inc., Carlsbad, CA (US)

( * ) Notice: Subject to any disclaimer, the term of this patent is extended or adjusted under 35 U.S.C. 154(b) by 676 days.

(21) Appl. No.: 12/356,842

(22) Filed: Jan. 21, 2009

(65) Prior Publication Data

US 2009/0161732 A1     Jun. 25, 2009

Related U.S. Application Data

(63) Continuation of application No. 11/538,431, filed on Oct. 3, 2006, now abandoned, which is a continuation-in-part of application No. 11/431,228, filed on May 9, 2006, now abandoned, which is a continuation of application No. 09/531,996, filed on Mar. 20, 2000, now Pat. No. 7,065,125.

(60) Provisional application No. 60/148,925, filed on Aug. 13, 1999.

(51) Int. Cl.
*H04B 1/00*     (2006.01)

(52) U.S. Cl. ........ 375/130; 375/135; 375/136; 375/140; 375/146; 375/147; 375/149

(58) Field of Classification Search .......... 375/135–136, 375/140, 146–147, 149
See application file for complete search history.

(56) References Cited

U.S. PATENT DOCUMENTS

| | | | |
|---|---|---|---|
| 4,616,108 A | 10/1986 | Yamaguchi et al. | |
| 4,748,622 A | 5/1988 | Muratani et al. | |
| 5,084,900 A | 1/1992 | Taylor | |
| 5,367,536 A | 11/1994 | Tsujimoto | |
| 5,450,395 A | 9/1995 | Hostetter et al. | |
| 5,533,012 A | 7/1996 | Fukasawa et al. | |
| 5,537,397 A | 7/1996 | Abramson | |
| 5,577,025 A | 11/1996 | Skinner et al. | |
| 5,581,547 A | 12/1996 | Umeda et al. | |
| 5,596,439 A | 1/1997 | Dankberg et al. | |
| 5,745,485 A | 4/1998 | Abramson | |
| 5,761,196 A | 6/1998 | Ayerst et al. | |

(Continued)

FOREIGN PATENT DOCUMENTS

CA     2260329 A     8/1999

(Continued)

OTHER PUBLICATIONS

Davis et al., "Performance of Slotted Aloha Random Access with Delay Capture and Randomized Time of Arrival," IEEE Transactions on Communications, vol. Com-28, No. 5, May 1980, pp. 703-710.

(Continued)

*Primary Examiner* — Curtis Odom
(74) *Attorney, Agent, or Firm* — Kilpatrick Townsend & Stockton LLP

(57) ABSTRACT

A communication technique based on direct sequence spread spectrum signaling employs, for all users sharing an access channel, a single spreading code that has a duration sufficiently longer than the symbol length that the likelihood of confusion between users is minimized if not eliminated. The length of the spreading code is sufficiently long that contention events can occur only when two bursts occur at the receiver within one chip time of one another.

8 Claims, 4 Drawing Sheets

U.S. PATENT DOCUMENTS

| | | | |
|---|---|---|---|
| 5,898,681 A | 4/1999 | Dutta | |
| 5,903,555 A | 5/1999 | Wildauer et al. | |
| 5,966,377 A * | 10/1999 | Murai | 370/342 |
| 6,002,454 A | 12/1999 | Kajiwara et al. | |
| 6,018,555 A | 1/2000 | Mahany | |
| 6,037,835 A | 3/2000 | Smith et al. | |
| 6,044,074 A * | 3/2000 | Zehavi et al. | 370/350 |
| 6,163,533 A | 12/2000 | Esmailzadeh et al. | |
| 6,229,796 B1 | 5/2001 | Dent | |
| 6,259,724 B1 | 7/2001 | Esmailzadeh | |
| 6,263,035 B1 | 7/2001 | Maresca | |
| 6,269,088 B1 * | 7/2001 | Masui et al. | 370/335 |
| 6,381,233 B1 | 4/2002 | Sunaga | |
| 6,389,059 B1 * | 5/2002 | Smith et al. | 375/141 |
| 6,480,523 B1 | 11/2002 | Kondo | |
| 6,487,183 B1 | 11/2002 | Lo et al. | |
| 6,511,020 B2 | 1/2003 | Higgins | |
| 6,539,005 B1 | 3/2003 | Kim et al. | |
| 6,606,341 B1 * | 8/2003 | Kanterakis et al. | 375/130 |
| 6,621,860 B1 | 9/2003 | Yamaguchi et al. | |
| 6,735,188 B1 | 5/2004 | Becker et al. | |
| 6,847,626 B1 | 1/2005 | Carneal et al. | |
| 6,865,609 B1 | 3/2005 | Gubbi et al. | |
| 6,937,580 B2 | 8/2005 | Heatwole et al. | |
| 6,985,725 B2 | 1/2006 | Berger | |
| 7,027,454 B2 | 4/2006 | Dent | |
| 7,065,125 B1 | 6/2006 | Miller et al. | |
| 7,113,743 B2 | 9/2006 | Karabinis | |
| 7,142,809 B1 | 11/2006 | Godwin | |
| 7,149,526 B2 | 12/2006 | Karabinis et al. | |
| 7,203,204 B2 | 4/2007 | Carneal et al. | |
| 7,336,967 B2 | 2/2008 | Kelly et al. | |
| 7,415,001 B2 | 8/2008 | Naguleswaran et al. | |
| 7,450,914 B2 | 11/2008 | Valdivia et al. | |
| 2002/0021678 A1 | 2/2002 | Heatwole et al. | |
| 2002/0031120 A1 | 3/2002 | Rakib | |
| 2002/0032003 A1 | 3/2002 | Avitzour et al. | |
| 2003/0027522 A1 | 2/2003 | Valdivia et al. | |
| 2003/0073435 A1 | 4/2003 | Thompson et al. | |
| 2004/0023658 A1 | 2/2004 | Karabinis et al. | |
| 2004/0157560 A1 | 8/2004 | Yamasaki | |
| 2006/0209928 A1 | 9/2006 | Miller et al. | |
| 2007/0127553 A1 | 6/2007 | Miller et al. | |
| 2009/0081946 A1 | 3/2009 | Dankberg et al. | |
| 2009/0092037 A1 | 4/2009 | Hadad | |
| 2009/0129334 A1 | 5/2009 | Ma et al. | |

FOREIGN PATENT DOCUMENTS

| | | |
|---|---|---|
| CA | 2381776 C | 12/2009 |
| EP | 0 936 749 A1 | 8/1999 |
| EP | 1203456 B1 | 5/2008 |
| WO | WO 96/19050 A | 6/1996 |
| WO | WO 96/24206 A | 8/1996 |
| WO | WO 98/18280 A | 4/1998 |
| WO | WO 01/13534 A1 | 2/2001 |
| WO | WO 2008/042672 A2 | 4/2008 |

OTHER PUBLICATIONS

Glisic et al., "Spread Spectrum CDMA Systems for Wireless Communications," Apr. 1, 1997, pp. 354-367, Library of Congress Cataloging-in-Publication Data.

Lee et al., "Capacities of Single-Code and Multicode DS-CDMA Systems Accommodating Multiclass Services," IEEE Transactions on Vehicular Technology, vol. 48, No. 2, Mar. 1999, pp. 376-384.

Pateros, "An Adaptive Correlator Receiver for Spread Spectrum Communication," A Thesis Submitted to the Graduate Faculty of Rensselaer Polytechnic Institute in Partial Fulfillment of the Requirements for the Degree of Doctor of Philosophy, (Mar. 1993), 135 pages.

Simon et al., "Spread Spectrum Communications Handbook," published in three volumes By Computer Science Press 1985, 18 pages, McGraw-Hill, Inc.

Van Nee et al., "Slotted Aloha and Code Division Multiple Access Techniques for Land-Mobile Satellite Personal Communications," IEEE Journal on Selected Areas in Communications, vol. 13, No. 2, Feb. 1995, pp. 382-388.

International Search Report corresponding to the PCT Application No. PCT/US00/22313, date of mailing Dec. 4, 2000, 3 pages total.

International Preliminary Examination Report corresponding to the PCT Application No. PCT/US00/22313, date of mailing Sep. 27, 2001, 6 pages total.

PCT Written Opinion corresponding to the PCT Application No. PCT/US00/22313, date of mailing May 25, 2001, 7 pages total.

International Search Report and Written Opinion corresponding to the PCT Application No. PCT/US2007/079559, date of mailing Jul. 10, 2008, 14 pages total.

International Preliminary Report on Patentability corresponding to the PCT Application No. PCT/US2007/079559, dated Apr. 7, 2009, 8 pages total.

Communication pursuant to Article 96(2) EPC, corresponding to the EP Application No. 00 959 234.6-2411, dated Jul. 12, 2005, 4 pages total.

* cited by examiner

METHOD AND APPARATUS FOR MULTIPLE ACCESS OVER A COMMUNICATION CHANNEL

CROSS-REFERENCES TO RELATED APPLICATIONS

This application is a continuation application claiming priority through Continuation-in-Part application Ser. No. 11/538,431 filed Oct. 3, 2006 of Continuation application Ser. No. 11/431,228 filed May 9, 2006 of U.S. application Ser. No. 09/531,996, filed Mar. 20, 2000, now U.S. Pat. No. 7,065,125 issued Jun. 20, 2006, which in turn claims the benefit of U.S. Provisional Application No. 60/148,925, filed Aug. 13, 1999, all of which are incorporated by reference herein in their entirety for all purposes. The present claimed subject matter derives priority from the earliest filed patent application.

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

The present invention relates generally to communication techniques and in particular to a spread spectrum communication technique over a shared asynchronous channel of a communication network.

A spread spectrum communication system is a system in which the transmitted signal is "spread" over a wide range of frequencies. Typically the bandwidth is much wider than the minimum bandwidth needed to transmit the information being sent. The underlying premise of this technique is that, in channels (typically wireless) with narrowband noise, an increase in the transmitted signal bandwidth produces a corresponding increase in the probability that the received information will be correct.

Though inefficient in its use of bandwidth, an advantage of spread spectrum is its resistance to interference. Another advantage is that the technique can be combined with existing systems having narrower operating bandwidths that fall within the spread spectrum bandwidth. The presence of a spread spectrum signal only slightly increases the noise floor that the narrow band receivers see.

Various spread spectrum techniques are known: In a frequency hopping system, the carrier frequency of the transmitter changes from among a pre-selected set of carrier frequencies in accordance with a pseudo-random code sequence. The frequencies selected from the list are dictated by the codes in the sequence. In a time hopping system, the period and duty cycle of the pulsed radio frequency ("RF") carrier are varied in a pseudo-random manner in accordance with the pseudo-random code sequence. In a pulsed frequency modulated ("FM") system, the RF carrier is modulated with a fixed period and fixed duty cycle sequence. During the transmission of each pulse, the carrier frequency is frequency modulated. Hybrid systems incorporate aspects of two or more other systems.

Direct sequence ("DS") spread spectrum is a well known technique for transmitting digital data. The name direct sequence derives from the fact that the data sequence is directly multiplied by a high rate spreading sequence before it is transmitted over the channel. The spreading sequence is a sequence that transitions much faster than the data sequence. Instead of being called bits as in the data sequence, the individual states of the spreading sequence are called chips. The ratio of the chip rate to the data rate is commonly known as the spreading gain (or processing gain), since it is the ratio by which the bandwidth of the data sequence is increased once it is multiplied by the spreading sequence.

Refer to FIG. 1 for an illustration of the operation of direct sequence signaling. The figure shows a time domain representation of a case in which the chip rate of spreading sequence signal C is four times the rate of the data sequence D; i.e.

$$\frac{1}{t_C} = 4 \times \frac{1}{t_D}.$$

The resulting spread signal S is the product of the two sequences. When the data bit in D is in a first logic state, signal S follows the spreading sequence C and when the data bit in D is in second logic state, signal S is the complement of C. The spreading sequence signal shown in FIG. 1 does not repeat. In practice though, many conventional direct sequence spread spectrum techniques employ a spreading code that repeats once per data bit. Code representation 100 is the notational convention used in the disclosure of the present invention to represent a spreading sequence in explaining the operation of the invention. The top half of representation 100 contains an identifier for the code, in this case "Code C." The bottom half of representation 100 indicates the various chips in the spreading sequence and identifies them by number.

These spreading sequences are generally referred to as codes, as in Code Division Multiple Access ("CDMA"). CDMA generally refers to a technique by which users are allocated different spreading codes to enable them to use the same channel without interfering with each other. Another technique, dubbed Spread ALOHA CDMA ("SA/CDMA"), uses a single maximal length code (or a small number of maximal length codes for different service classes) that repeats once per data symbol and relies on arrival time to separate the different incoming signals. A maximal length code is a code of length $2^M-1$, where M is an integer, and which has certain desirable autocorrelation properties. For more information on maximal length codes, refer to Pateros, Charles N., "An Adaptive Correlator Receiver for Spread Spectrum Communication," Ph. D. Thesis, Rensselaer Polytechnic Institute, Troy, N.Y., 1993.

Various code spreading strategies are known: In U.S. Pat. No. 5,084,900 to Taylor, the technique described uses a slotted Aloha CDMA system, where each packet uses the same code for the first transmission. When a collision occurs on the first packet, the packet is retransmitted using randomly selected codes from a known pool of codes. No particular code type or relationship of code length to symbol interval is specified.

In U.S. Pat. No. 5,450,395, Hostetter et al. describe a single code system where data bit length codes are used and each user always transmits a data 'one'. The data is encoded in the time position of each broadcast. The technique requires accurate time synchronization among all of the users.

In U.S. Pat. No. 5,537,397, Abramson describes a spread ALOHA CDMA technique in which multiple users employ the same spreading code. The code is a maximal length code that repeats once per symbol. The users are time aligned at the chip level, but asynchronous at the data bit level. A subtractive multi-user receiver for this application is also described. In U.S. Pat. No. 5,745,485, Abramson extends his '397 patent to allow multiple codes to support different traffic types on the same channel.

Dankberg, et al. describe, in U.S. Pat. No. 5,596,439, a technique for self-interference cancellation for a relay channel. The technique is referred to as Paired Carrier Multiple Access ("PCMA"), since it allows a pair of channels (one in each direction) to share the same relay channel.

In U.S. Pat. No. 5,761,196, Ayerst, et al. describe a CDMA system employing re-use of spreading sequences. A central controller distributes seeds for maximal length codes as needed by users.

What is needed is a communication method which improves upon the multiple access collision performance of the prior art communication techniques. What is needed is a system which can realize improved performance over prior art CDMA communication systems without further complication to the system.

SUMMARY

According to the invention, a communication technique based on direct sequence spread spectrum signaling employs, for all users sharing an access channel, a single spreading code that has a duration sufficiently longer than the symbol length that the likelihood of confusion between users is minimized if not eliminated. The length of the spreading code is sufficiently long that the probability of collision is a function of chip period and not the spreading gain. Called Code Reuse Multiple Access ("CRMA"), the method is a novel and non-obvious extension of the Code Division Multiple Access ("CDMA") and Spread ALOHA CDMA ("SA/CDMA") multiple access techniques.

In accordance with the invention, a single spreading code, or at most a small number of spreading codes relative to the number of simultaneous transmitters is provided. In one embodiment, the length of the spreading code is substantially longer than the length of a data symbol such that there is minimal likelihood of interference or collision between. In another embodiment, then the spreading code does not repeat during modulation of the data sequence. To minimize the acquisition implementation complexity of the system, shortened codes are used in the preamble portion of a data burst. In one embodiment, the preamble is spread by using a code that repeats one or more times.

Further in accordance with the invention, the coding technique can be combined with a Paired Carrier Multiple Access ("PCMA") system. This combination provides a reverse channel without having to allocate an additional operating frequency range or having to provide a separate link.

Still further in accordance with the invention, a multi-user receiver structure efficiently processes a multitude of received signals by centralizing the header acquisition process. A header acquisition component tuned to a spreading code acquires received data bursts. A pool of demodulation components is provided. An individual user data transmission is then fed to a selected one of the demodulation components to process the data portion of the received data burst.

The present invention presents many advantages over prior art systems. The invention exhibits improved multiple access collision performance as compared to SA/CDMA systems. The improved performance is achieved without adding to the complexity of standard CDMA systems. Moreover, the invention further reduces system complexity by eliminating some of the limitations of SA/CDMA, since the spreading codes of the present invention are not required to be maximal length codes of data symbol length.

The invention will be better understood by reference to the following detailed description and accompanying drawings.

DESCRIPTION OF SPECIFIC EMBODIMENTS

Figure 1:
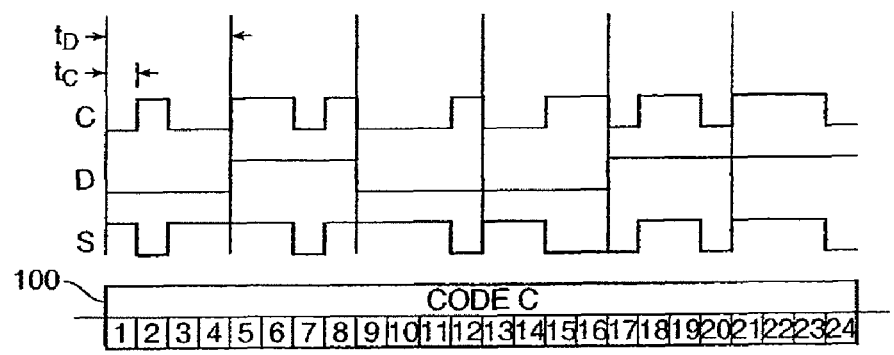
FIG. 1 is a diagram demonstrating the operation of direct sequence spread spectrum signaling.
Figure 2A:
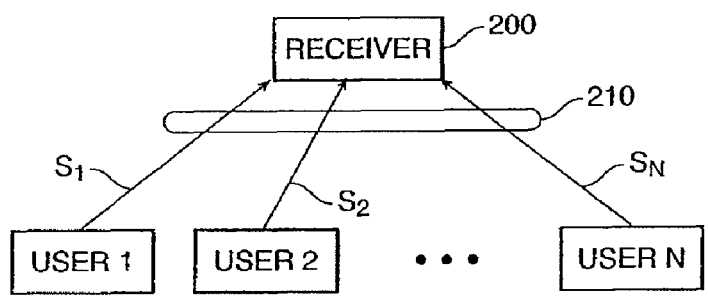
FIG. 2*a* is a diagram illustrating the code reuse multiple access ("CRMA") channel.

FIG. 2*a* shows a typical environment in which the present invention operates. As shown in the figure, a large number of users 1, 2, . . . N broadcast to a common multi-user receiver 200. The receiver demodulates all of the signals $S_1, S_2, \ldots S_N$ received on the single multiple access channel 210, it being understood that each signal $S_x$ occupies the same frequency range as the other signals. A property of this environment is that there is no synchronized coordination among the users and no time synchronization between each user 1, 2 . . . N and the receiver 200. Each user transmits independently of the other and asynchronously, in bursts based on its offered traffic. Consequently, there will be inevitable periods of time when two or more users are transmitting their signals to the receiver 200 simultaneously.

Figure 3:
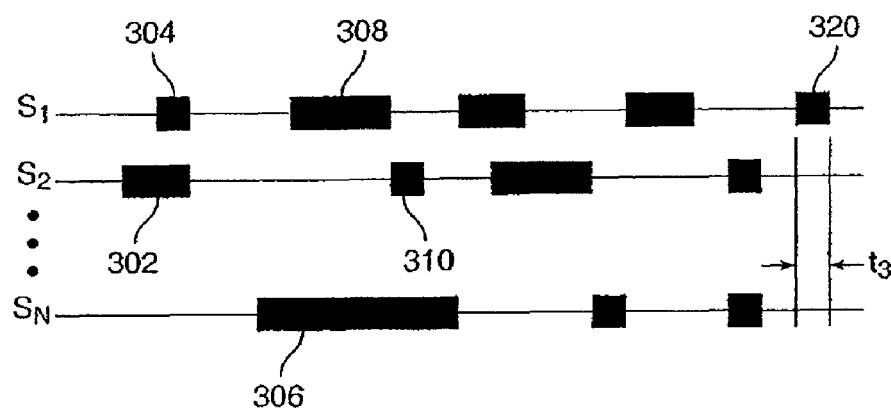
FIG. 3 is a diagram illustrating the operation of a standard multiple access channel.

Refer now to the traffic model of FIG. 3 which illustrates a typical pattern of transmission activity on a standard multiple access channel. The signals from the various users are active when that user is transmitting data. In the figure, User 2 is the first to transmit a burst 302. User 1 then transmits a burst 304 during the last half of the transmission of User 2's burst 302, and so on. In a standard channel, there is no way to separate the transmissions at the receiver, so any transmissions that overlap in time will be lost. The scenario depicted in FIG. 3 shows an especially congested traffic pattern. Bursts 302 and 304 overlap and so receiver 200 will not be able to separate the overlapping transmissions. Burst 306 overlaps initially with burst 308 from User 1 and then with burst 310 from User 2. The occurrence of two or more transmissions arriving such that they cannot be resolved is referred to as a "multiple access collision," or simply collision. In the scenario shown in FIG. 3, only the single transmission 320 received during the time period $t_3$ is received free of interference; it is the only transmission that is received successfully.

In Code Division Multiple Access ("CDMA"), each user is provided with a unique spreading code so that the bursts from different users can be more easily resolved. This requires a large number of codes. More significantly, the technique requires that each user have a corresponding receiver at the base station tied to that spreading sequence. This translates to a base station that is complex and costly to implement and maintain, since each user-assigned spreading code must have its own dedicated receiver hardware/firmware at the base station.

As discussed in U.S. Pat. No. 5,537,397 ("SA/CDMA"), the multiple access capability of a spread spectrum channel is not derived by the use of different spreading codes by each transmitter, but by the nature of the direct sequence spread spectrum signal itself. For minimum complexity, therefore, a single code system is ideal. U.S. Pat. No. 5,745,485 argues that different codes for different traffic types may be worth the extra complexity in the receiver in order to simplify the total system complexity. It should be noted here that the SA/CDMA systems as described in the referenced patents all use spreading sequences that have a period equal to the symbol period of the transmitted data. That is, the spreading sequence repeats in the same amount of time spanned by a data bit. As well, SA/CDMA utilizes maximal length spreading sequences, which have desirable properties, but are not required for multiple access.

Consider the prior art techniques wherein the spreading code repeats once per data symbol. Each time the code repeats, there is a potential collision with another user who starts transmitting within one chip period of this time. A collision, therefore, is the event when two transmitters use the same spreading sequence and each begins transmitting its data burst within a time span of 1 chip period of the other. The resulting interference of the collision makes both signals unusable to the receiver, so the data sent by both transmitters is lost. As U.S. Pat. No. 5,537,397 shows, the throughput of such a system is a function of the spreading gain, the number of spreading sequence chips per data symbol.

Figure 4:
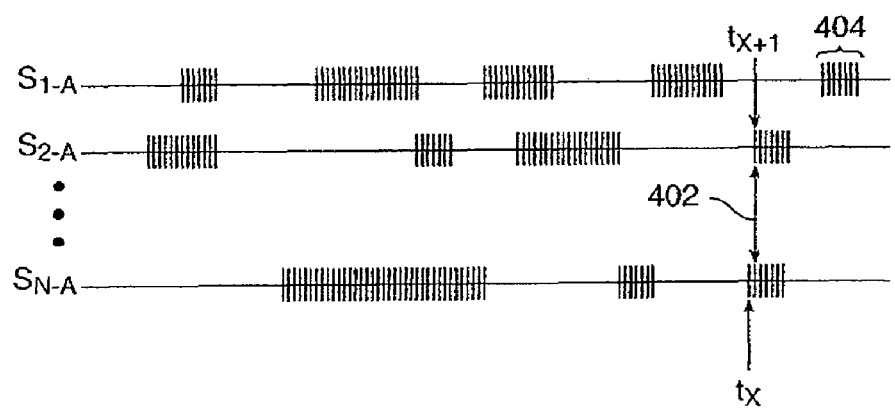
FIG. 4 is a diagram illustrating the operation of a Spread ALOHA/Code Division Multiple Access ("SA/CDMA") channel.

For the purpose of the invention, a unique notation was developed to facilitate the explanation and understanding of the features of the invention. Referring to FIG. 4, for example, each data burst is represented by a series of vertical lines. Each vertical line represents the beginning of the spreading code as it is being applied to (modulated onto) the data sequence comprising the data burst. Hence, each vertical line represents the modulation of one or more data symbols (data bits, where the transmitted information is binary data) by the spreading code. The number of data symbols modulated depends on the bit rate, the chip rate, and the number of chips comprising the spreading code. For example, given a symbol (bit) rate of five symbols (bits) per second and a 200-chip spreading sequence at a chip rate of 40 chips per second, 25 symbols (bits) are modulated in one cycle of the spreading sequence. Thus for a 100 symbol data sequence, the spreading sequence will repeat four times during modulation of the data sequence; the data sequence spans a total time of 20 seconds and the spreading sequence spans a time period of five seconds.

Figure 6:
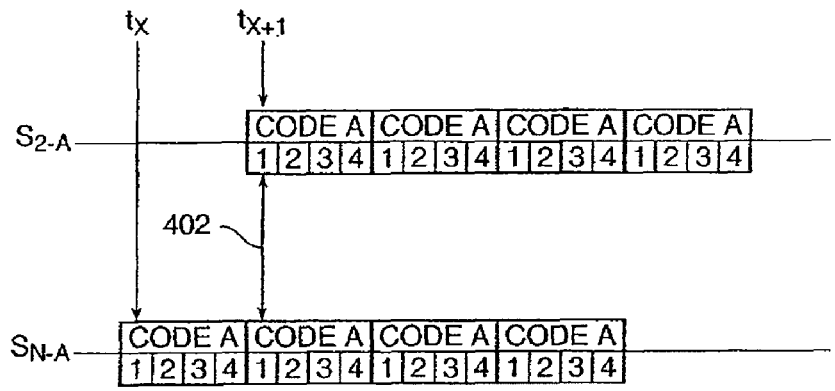
FIG. 6 is a diagram detailing a collision event in a SA/CDMA channel.

Refer again to the traffic model shown FIG. 3 and to the diagrams of FIGS. 4 and 6. As mentioned before, multiple access collisions can occur every time the spreading sequence repeats. FIG. 4 shows the traffic pattern depicted in FIG. 3 in an SA/CDMA channel, illustrating the operation of collision avoidance. Recall that under SA/CDMA, the spreading code repeats at a rate equal to the data rate, i.e., the code repeats for every data bit.

Consider the traffic pattern of FIG. 3. At time $t_x$ a data burst from user N (signal $S_{N-A}$) is transmitted. At time $t_{x+1}$, a data burst from user 2 (signal $S_{2-A}$) is transmitted. A collision between signal $S_{2-A}$ and signal $S_{N-A}$ occurs, since their spreading codes align within one chip interval at the time indicated by 402.

The reason for the occurrence of this collision is explained with reference to FIG. 6. Code A is used for the multiple access on the channel. User 2-A, transmitting signal $S_{2-A}$, begins his broadcast at the time indicated by 402. This occurs one data bit after User N-A, who broadcasts signal $S_{N-A}$. The first chip of the respective spreading codes aligns. Consequently, both transmissions are lost during the overlap because they cannot be resolved by the receiver into separate transmissions.

It has been discovered that the multiple access contention performance of the system can be improved by allowing the spreading code sequence length to be longer than the data symbol length. In one embodiment of the invention built upon this discovery, the spreading code sequence is longer than the length (i.e., number of bits) of the data sequence to be transmitted in a single data burst. It was discovered that the number of potential collisions decreases dramatically by this technique. In addition, the complexity needed to provide for chip and bit timing coordination is removed. Another advantage of the invention is that different users can transmit with different data rates simultaneously.

Figure 5:
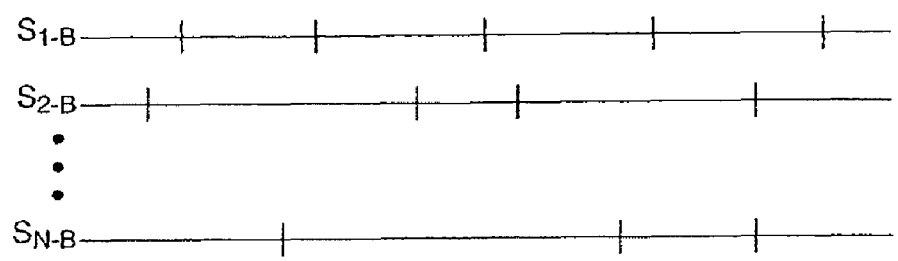
FIG. 5 is a diagram illustrating the operation of a CRMA channel according to the invention.

This collision reduction property is clearly demonstrated in FIG. 5 using the unique notational convention described above. FIG. 5 is also based on the traffic model of FIG. 3. According to one embodiment of the invention, a long code is used which does not repeat during the length of the data bursts. Consequently, each burst in FIG. 5 is represented by only one line. There is only one possible collision event per burst, greatly decreasing the collision probability. As can be seen in FIG. 5, for the traffic pattern of FIG. 3 no collisions occur.

Figure 7:
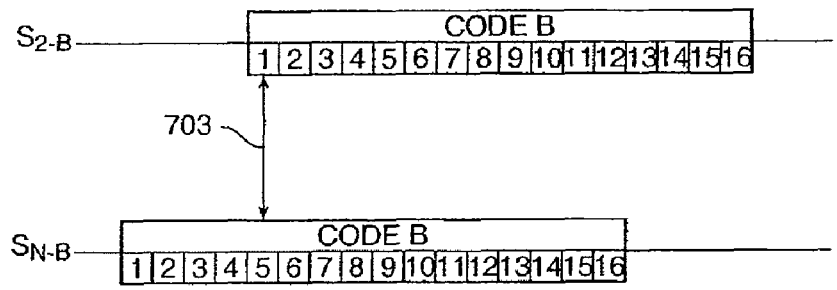
FIG. 7 is a diagram detailing the collision avoidance properties of CRMA.

Referring to FIG. 7, the figure details the same event that caused a collision for the SA/CDMA system in FIG. 6. Code B, which does not repeat during the length of the burst, is used for multiple access in this CRMA channel. Here, at the time indicated by reference numeral 703, the two broadcasts $S_{2-B}$ and $S_{N-B}$ are separated by exactly one data bit time, as in FIG. 6. However, since Code B does not repeat for the duration of the data burst, there is no collision.

In accordance with an embodiment of the invention, the length of the spreading code is longer than the length of a data symbol. Length refers to a span of time. Hence, the length of the spreading code refers to the length of time spanned by the code. For a spreading code, this depends on the number of chips in the code and the chip rate of the code. Similarly, the length of a data symbol is simply the inverse of the data rate. For example, a 10 bits/second data rate translates to a data symbol whose time length is 100 milliseconds. In addition, as will be discussed shortly, one can speak of the length of a spreading code in terms of its spreading gain g which is the ratio of the chip rate to the data rate.

In an embodiment of the invention, spreading codes are selected that are much longer than a data symbol. Thus, the spreading code can have a length that exceeds the length of the longest data sequence. For example, a data sequence of 100 bits at 10 bits/second data rate would have a length of 10 seconds. In accordance with an embodiment of the invention, the spreading code would span period of time greater than 10 seconds long. Expressed in terms of spreading gain g, a spreading code having a 10 second period would comprise (100×g) chips. In this case, there would be only one possible contention event per burst. Only if two transmitters started their bursts within one chip time of each other would a contention collision occur. Note that the collision probability is only a function of the chip period (not the spreading gain) and the burst transmission rate.

Generation of long spreading codes is a straightforward process. Well understood pseudo-random number generation techniques are known for producing spreading sequences (codes). Similarly, it is a simple matter to provide logic which breaks up the long spreading codes into segments of lengths appropriate for the modulation of a data sequence in preparation for transmission, and for the subsequent demodulation of a received data burst.

It is noted the invention is advantageous in that a transmitter can receive data for transmission at a rate different from another transmitter. Consequently, the spreading gain of one transmitter can be different from the spreading gain of another transmitter.

Figure 12:
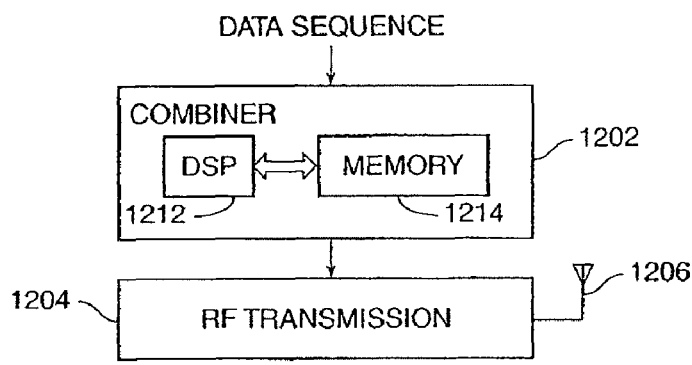
FIG. 12 is a schematic representation showing the basic components of a transmitting station in accordance with the invention.

Referring for a moment to FIG. 12, an embodiment of a transmitter according to the invention includes a data source to provide data sequences for transmission. The data sequence feeds into a combining component 1202 which produces the spread sequence for transmission. The combining component preferably includes a digital signal processor ("DSP") 1212 in communication with a memory 1214. DSP firmware is provided to perform the spreading operations. Among other things, memory 1214 contains the spreading code(s) to be combined with an incoming data sequence by DSP 1212. As will be explained further below, memory 1214 also contains the spreading code(s) used to spread the data preamble for the preamble portion of transmitted data burst. Combining component 1202 feeds the spread signal to a conventional transmission component 1204 for subsequent transmission.

An impact that must be considered are the ramifications of using the long code scheme of the present invention in connection with the burst acquisition complexity. At the beginning of each broadcast burst, a known data preamble is transmitted to allow the receiver to acquire the transmitted signal. Typically this involves correlating the incoming signal with a stored copy of the spread header. For the case of a spreading sequence that is only the length of the data bit, the correlator need only be as long as the data bit. For longer codes, the correlator has to be as long as the shorter of the spreading code length or the header length. Complexity in the correlator component is an issue because the multiply and add operations of the correlator must run at the chip rate, rather than at the much slower data symbol rate. Once the signal is acquired, the downstream demodulation of the data portion of the data burst occurs at the data symbol rate. Hence, the data portion of a burst can be spread using much longer codes without degrading system performance during demodulation at the receiving end.

To address the complexity of the acquisition component, two strategies are provided in accordance with the invention. First, we can minimize the effective length of the spreading sequence in connection with the preamble portion of the data burst. Two techniques for accomplishing this are provided by the invention.

Figure 8:
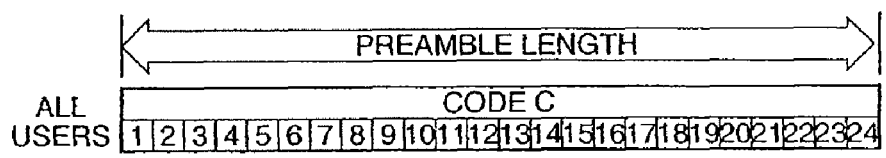
FIG. 8 is a diagram illustrating a spreading code that does not repeat during the burst preamble.

FIG. 8 illustrates the first technique. Where the spreading code, Code C, is longer than the preamble, the code is truncated to a length to fit the period of time spanned by the data sequence comprising the preamble. Note that though the entire length of the spreading code may be longer than the preamble, it can be considered to be the length of the preamble for acquisition purposes. If this code requires a preamble detector that is too complex to implement, then shorter codes can be used that repeat during the preamble. This is the second technique, namely, repeating segments of the spreading sequence during the preamble. It is noted that this second technique has the effect of increasing the collision probability, thus presenting a design trade-off decision to the system designer. However, another aspect of the invention permits shorter codes to be used, while keeping the collision probability the same. The discussion now turns to additional embodiments of the invention.

Figure 9:
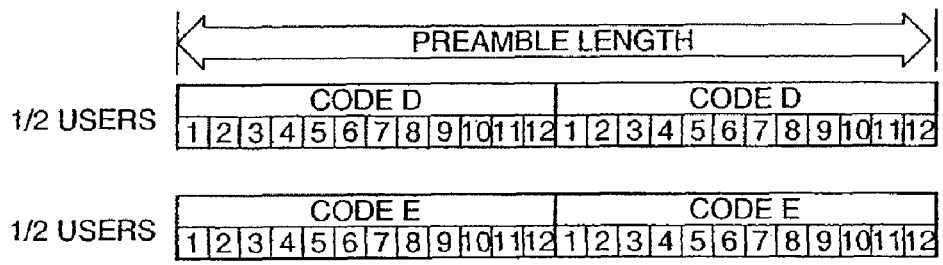
FIG. 9 is a diagram illustrating the process of splitting a preamble spreading code into two shorter codes that repeat during the burst preamble.

In the embodiment shown in FIG. 9, two codes are employed, Code D and Code E. One half of the transmitters use Code D to spread its preamble data sequence and the half of the transmitters use Code E. Each code is half the length of the preamble and repeats once during modulation of the preamble. Each time the code repeats, a multiple access collision can occur among the transmitters using Code D; likewise with the Code E transmitters. However, since only half of the channel users will be using either Code D or Code E, the collision probability is the same as if all users were using a single, long code. Note that all users could use the same code, Code D. This would result in a simpler system that had a larger probability of collision compared to a system employing Code C.

Figure 10:
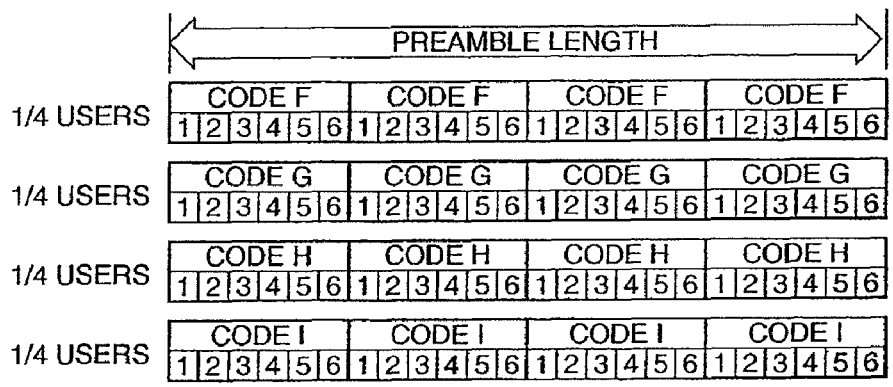
FIG. 10 is a diagram illustrating the process of splitting a preamble code into four shorter codes that repeat during the preamble.

To further lower the correlation overhead in the acquisition circuitry, this process is further extended in FIG. 10. Here, four codes, Code F, Code G, Code H and Code I, are utilized by four groups of transmitters. Each code repeats four times during modulation of the preamble, so the four codes are each allocated to one fourth of the users. Hence by splitting the preamble spreading code in this fashion, per the invention, the complexity in the acquisition circuitry is greatly reduced without affecting the collision performance. Here, the use of one, two or three codes would simplify the acquisition system while again increasing the collision probability compared to a system using a longer code.

The spreading code used for spreading the preamble data sequence can be simply a portion of the spreading code used to spread the data sequence of the data portion of the burst. More generally, the spreading code for the preamble does not have to be derived from the spreading code for the data portion. In an embodiment of the invention, more than one spreading code is used for spreading preambles, while an identical longer code is used to spread the data sequence of the data burst. In yet another embodiment of the invention, more than one spreading code is used for spreading preambles, while two or more identical longer codes are used to spread the data sequences of data bursts from multiple transmitters.

The preamble is always shorter than the burst, and is often a very small fraction of the burst. Thus, the multiple access collision performance of the system may be adequate even if there is only one spreading code used for the burst preambles, and even if that code repeats many times during the preamble interval. The performance enhancement comes about by the use of the longer code used for the data portion of the data bursts.

In still yet another embodiment, one may consider the bandwidth of the single carrier multiple access channel. If the channel bandwidth far exceeds the bandwidth required of the highest spreading chip rate, then the channel may be divided into multiple narrower sub-channels. The sub-channels may be of equal or unequal bandwidth, depending on the bandwidth requirements of the different spreading codes. Thus, where lower complexity transmitters are desired, this embodiment realizes greater utilization of a given multiple access carrier channel by allowing for lower chip rates.

Figure 11:
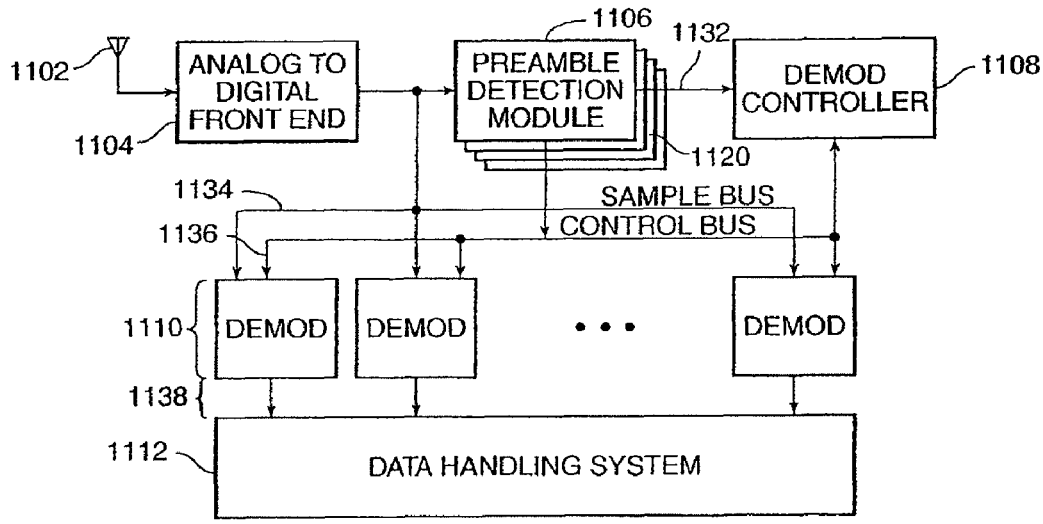
FIG. 11 is a schematic representation of a multi-user receiver in accordance with the present invention.

FIG. 11 shows a receiver 1100 configured in accordance with the invention. The receiver represents the second strategy to address the acquisition complexity issue. The embodiment of receiver 1100 shown in FIG. 11 uses a preamble detector module (typically implemented as a correlator) that hands off the demodulation to a pool of demodulators.

Receiver 1100 includes an antenna 1102 for receiving a beam bearing a signal. The antenna feeds the signal to an analog-to-digital (a/d) front end 1102. The a/d front end is coupled to a preamble detection component 1106. A demodulation controller component 1108 selectively activates a pool of demodulation units 1110. The demodulation units feed into a data handling system 1112.

In operation, an incoming signal is received by an antenna 1110 and is processed by a/d front end 1102. The front-end digitizes the signal to produce a stream of samples. The samples are placed on a digital sample bus 1134. The sample bus makes the samples available to preamble detection component 1106 and to the demodulation units in demodulator pool 1110.

The preamble detection component receives the sample stream, and using the same data preamble and preamble spreading code as in the transmitters, determines the timing, phase and frequency offsets of transmission preambles in the received signal. This detection data is placed on a control bus 1136.

In an alternate embodiment, transmitters are divided into two or more groups. Each group having a preamble spreading code (or codes) assigned to it where each transmitter in a group uses its assigned spreading code to spread the preamble. At the receiver end, additional preamble detectors 1120 are provided, one for each spreading code that is used. The output of a/d front end 1104 feeds into each of the additional preamble detection components 1120.

When a burst is detected by preamble detection component 1106, demodulation controller 1108 is activated by appropriate signaling over control line 1132. The demodulation controller selects an idle demodulator from pool 1110. The selected demodulator picks up the corresponding detection data from sample bus 1134 and utilizes it to process the data portion of the burst. After demodulation, the demodulator forwards the demodulated data to data handling system 1112 over signal bus 1138. Once the burst is over, the demodulator informs demodulation controller 1108. The demodulator is placed back into the pool of available demodulators 1110. The number of demodulators in pool 1110 is a function of the maximum number of simultaneous transmitters that are allowed on the channel. This number is typically determined by the number of simultaneous transmissions that can occur on the channel without compromising the ability of the receiver to detect all the transmitters.

Figure 2B:
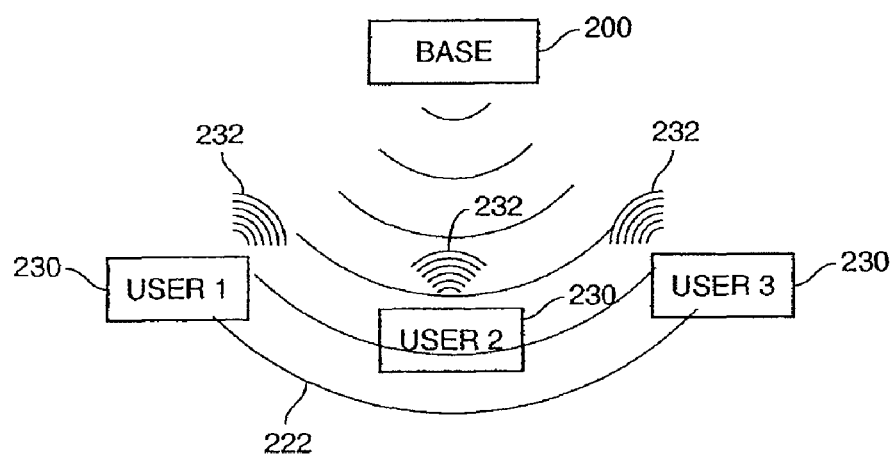
FIG. 2*b* is an alternate embodiment illustrating the CRMA technique in conjunction with a paired channel multiple access ("PCMA") system.

Referring to FIG. 2b, in another embodiment of the present invention, the inventive code reuse scheme is combined with a PCMA technique. This communication technique is explained, for example, in U.S. Pat. No. 5,596,439, which is fully incorporated herein for all purposes. In this embodiment, a base station 220 is the hub to which a number of users are connected. The forward channel is a high powered signal 222 that is broadcast from the hub to all the users 230. The reverse channel 232 (backchannel), from the users back to the hub, is a CRMA channel configured according to the present invention. By using PCMA, hub 220 can broadcast data (as well as control messages) to users 230 in the same frequency band as the multiple access reverse channels. By employing PCMA, the hub can remove its own transmitted signal from its received signal and then detect all the CRMA users accordingly as disclosed above.

The unique combination of a PCMA technique and the inventive code reuse technique permits data exchange in both directions between a base station and its associated transmitters. Conventionally, the back-channel is provided by a landline connection or by a wireless method that uses a different frequency range. An advantage of this unique combination is that the back-channel is obtained practically for free. The back-channel can contain controlling information sent to the hub. The hub can be an Internet service provider (ISP) where the downlink is the PCMA channel and user inputs are transmitted by the CRMA channel of the invention.

The invention has been explained with reference to specific embodiments. Other embodiments will be evident to those of ordinary skill in the art in light of this disclosure. Therefore, it is not intended that this invention be limited, except as indicated by the appended claims.

What is claimed is:

1. A method for communication of digital data from a plurality of independent transmitters to a common receiver, the method comprising:
    modulating data bursts at the transmitters into symbols;
    spreading the symbols using a single common spreading code at a single common rate according to direct sequence spread spectrum signaling to obtain spread spectrum symbols, wherein said single common spreading code has a duration longer than the longest data burst that can be transmitted;
    transmitting the bursts of the spread spectrum symbols from the transmitters on a single shared asynchronous random access channel; and
    receiving the bursts at the single common receiver wherein multiple bursts may overlap in time and wherein two transmission bursts collide only if the received bursts are separated by less than the duration of a single chip of said single common spreading code.

2. The method according to claim 1 wherein at least two of said transmitters modulate data bursts into symbols of different rates.

3. The method according to claim 1 wherein a preamble sequence spreading code is used in a preamble sequence of a burst transmission.

4. The method according to claim 3 wherein the preamble sequence spreading code repeats during the preamble.

5. The method according to claim 4 wherein said transmitters are divided into a number of groups in which each group employs a different repeating preamble spreading code.

6. A system for communication of digital data from a plurality of independent transmitters to a common receiver, the system comprising:
    a modulator at each of the transmitters for modulating data bursts into symbols;
    an encoder at each of the transmitters for spreading the symbols using a single common spreading code at a single common rate according to direct sequence spread spectrum signaling to obtain spread spectrum symbols, wherein said single common spreading code has a duration longer than the longest data burst that can be transmitted;

wherein the transmitters are operative to transmit the bursts of the spread spectrum symbols on a single shared asynchronous random access transmit channel; and a single receiver for receiving the bursts on a single channel wherein multiple bursts may overlap in time and wherein two transmission bursts only collide if the received bursts are separated by less than the duration of a single chip of said single common spreading code.

7. A transmitter for communication of digital data in conjunction with other transmitters from plurality digital data from a plurality of independent transmitters to a common receiver, the transmitter comprising:

a modulator for modulating data bursts into symbols;

an encoder for spreading the symbols using a single common spreading code at a single common rate according to direct sequence spread spectrum signaling to obtain spread spectrum symbols, wherein said single common spreading code has a duration longer than the longest data burst that can be transmitted; and a transmission module operative to transmit the bursts of the spread spectrum symbols on a single shared asynchronous random access transmit channel wherein multiple bursts may overlap in time and wherein two transmission bursts collide only if the received bursts at the common receiver are separated by less than the duration of a single chip of said single common spreading code.

8. A receiver for receiving communications of digital data from a plurality of transmitters, the receiver comprising:

a receiving subsystem for receiving, from the plurality of transmitters via on a single common channel, asynchronous bursts of spread spectrum data symbols;

a decoder for the decoding spread spectrum data symbols, said spread spectrum data symbols sharing a single common spreading code that has a duration longer than the longest data burst that can be transmitted, wherein multiple bursts may overlap in time and wherein two transmission bursts collide only if the received bursts at the common receiver are separated by less than the duration of a single chip of said single common spreading code.

* * * * *